Patented June 6, 1939

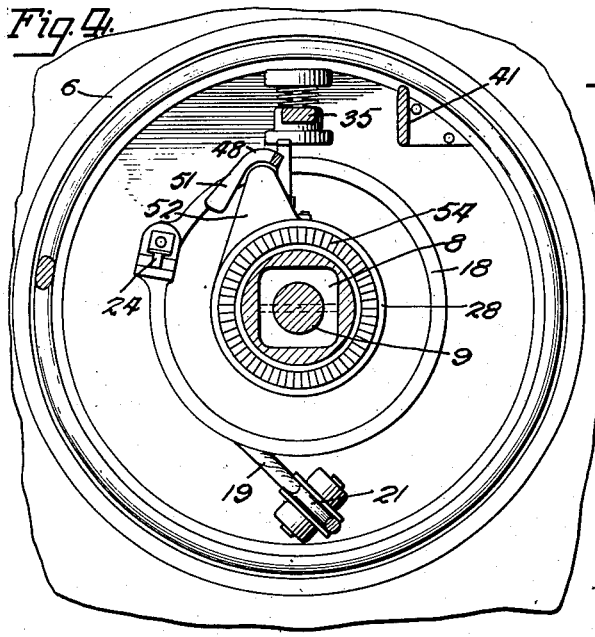
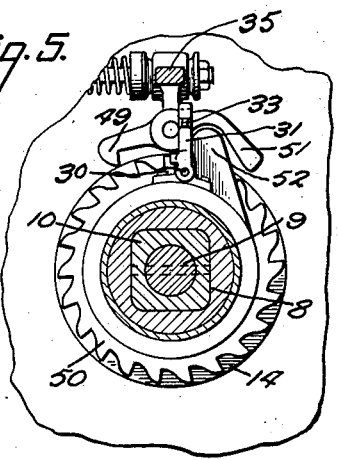
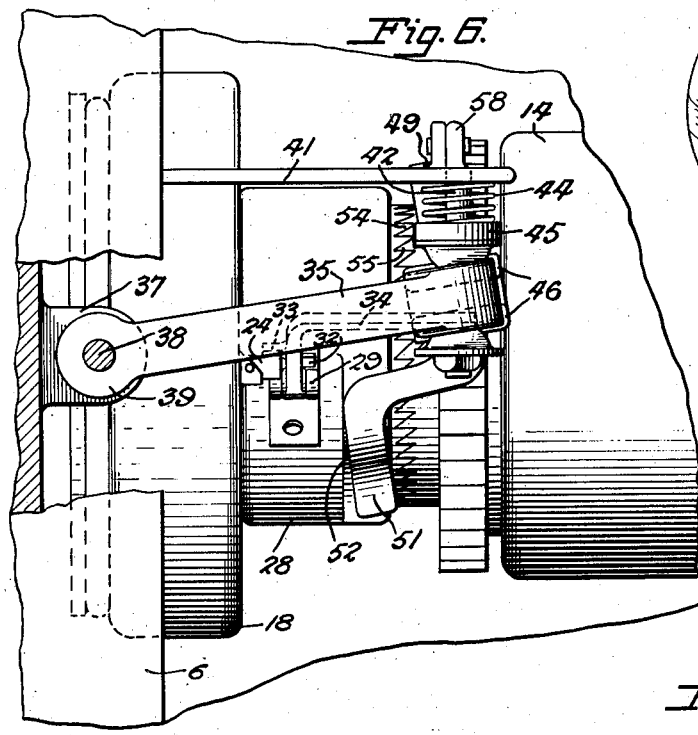
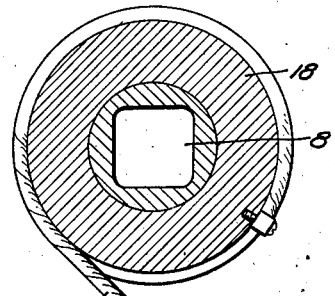
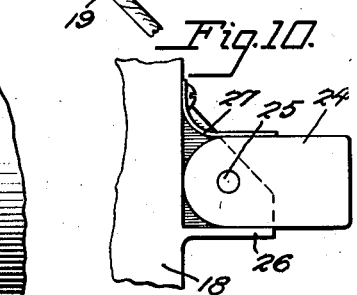

2,160,859

UNITED STATES PATENT OFFICE 2,160,859

BRAKE SLACK TAKE-UP MECHANISM

Francis O. Grayson, Coral Gables, Fla.

Application November 12, 1937, Serial No. 174,236

14 Claims. (Cl. 188—202)

This invention relates to automatic brake slack compensation mechanism applicable to the brakes of all types of transportation vehicles.

In all forms of friction vehicle braking, the mere fact of surfaces rubbing or passing upon one another to cause retardation of the vehicle implies wear of the surfaces. It is consequently an accepted obligation that adjustment for this wear shall be made at proper periods, and all forms of mechanism for braking include means for adjustment.

In general, adjusting means may be classified as manual and automatic. Manual means requires that a person shall proceed at a proper time to make the adjustment by means of hand tools. Automatic means combine suitable mechanism with a source of power such as a spring or fluid pressure, the adjustment being effected at a predetermined point in the wear of the surfaces. Within the limit of its capacity, automatic adjusting mechanism is designed to operate without manual effort and thus the adjustment is not subject to the faults resulting from neglect to give attention at the requisite time.

The present invention relates particularly to automatic brake slack compensating mechanism for brakes of the fluid pressure type. Heretofore it has been the practice to locate the slack compensating means in the brake rigging somewhere between the vehicle braking surfaces and the source of power, such as the brake chamber in an automobile or the brake cylinder in a railroad vehicle. This has called for mechanisms the mounting of which has involved difficulties as to suspension and clearance.

One of the objects of the present invention is to provide automatic brake slack compensation mechanism which is entirely contained within the brake chamber or brake cylinder as the case may be.

Other objects of the invention reside in the elements and combinations of elements as will appear in the following description, of a preferred and practical embodiment of my invention, as it proceeds.

In the drawings which accompany and form a part of the following specification and throughout the several figures of which the same characters of reference have been employed to designate identical parts:

Figure 4 is a cross section taken along the line 4—4 of Figure 1;

Figure 5 is a partial cross section substantially on line 5—5 of Figure 1 illustrating the pawl and ratchet means for effecting the brake slack compensation;

Figure 6 is a plan view partly in section illustrating the coacting group of compensating elements between the measuring wheel and the compensating nut;

Figure 7 is a sectional view taken in a plurality of planes perpendicular to the axis of the brake piston illustrating details of the compensating mechanism;

Figure 8 is a perspective view of the pawl lever;

Figure 9 is a diametrical section through the measuring wheel; and

Figure 10 is a plan view of the adjusting pin.

Figure 1:
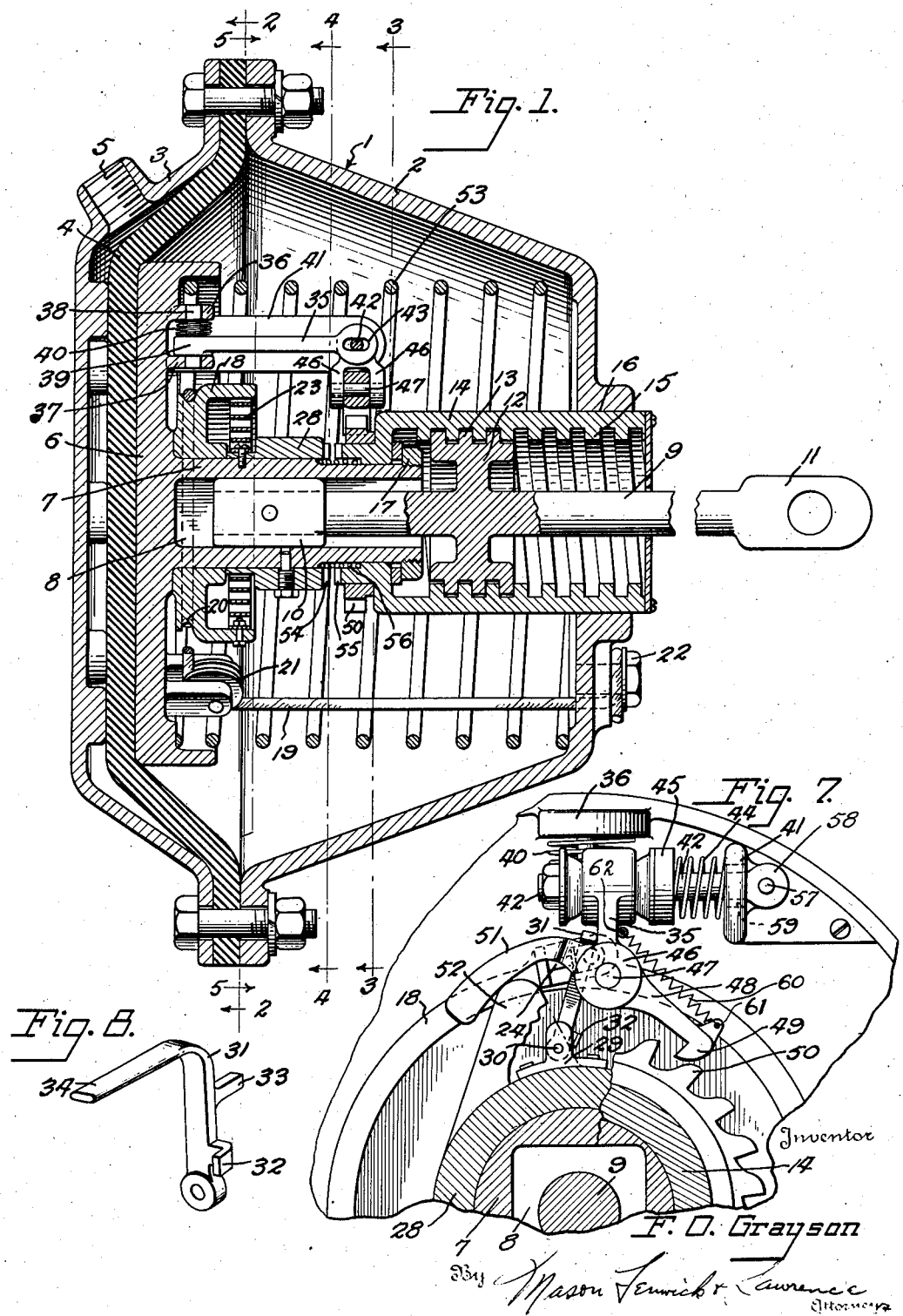
Figure 1 is a vertical section through a brake chamber illustrating brake slack compensating mechanism operating according to the principles of the present invention.
Figure 2:
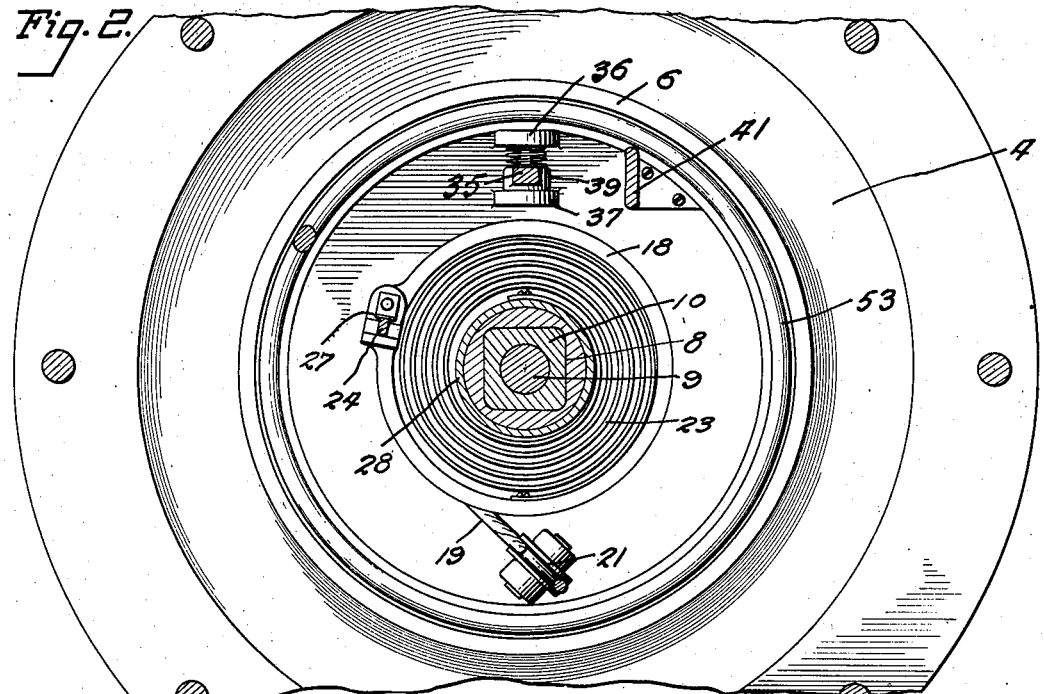
Figure 2 is a cross section taken along the line 2—2 of Figure 1.
Figure 3:
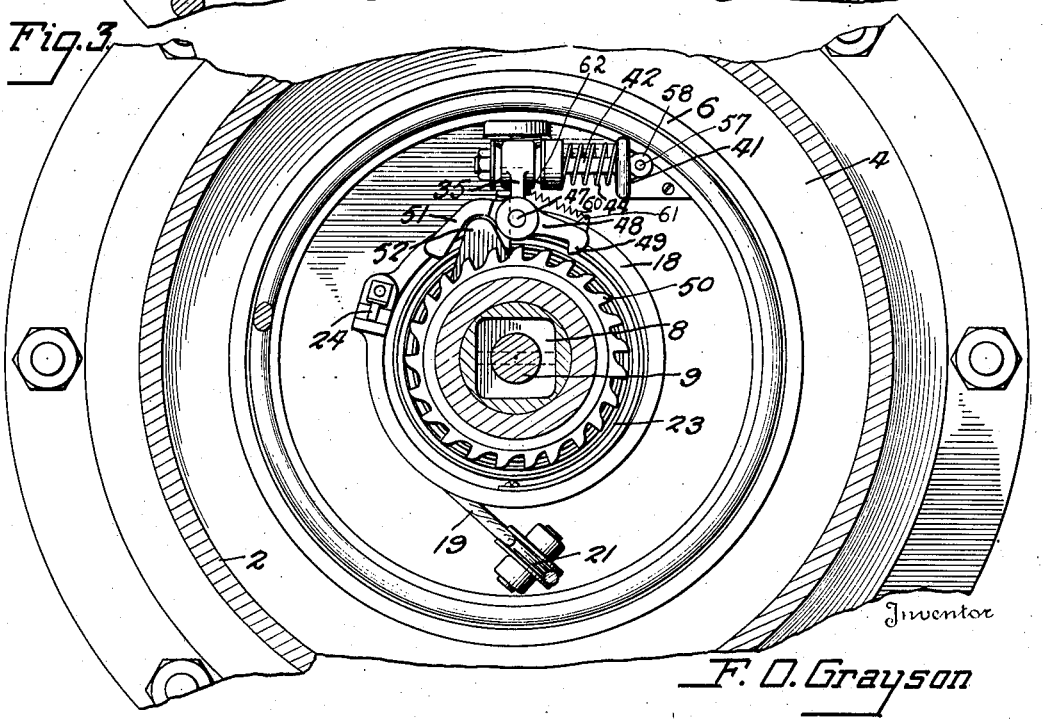
Figure 3 is a cross section taken along the line 3—3 of Figure 1.

Referring now in detail to the several figures, the numeral 1 represents in general the brake chamber of a fluid pressure brake system for automobiles. Insofar as illustrating the invention is concerned, it may as well have been the fluid pressure cylinder of a braking system for railway vehicles. As shown it comprises the front 2 and back covers 3, respectively, bolted together through registering flanges, there being a flexible diaphragm 4 clamped between the flanges.

The back cover 3 is provided with the fluid pressure inlet 5. A piston 6 is within the braking chamber having a trunk 7 provided with a recess 8 of non-round cross section. A push rod 9 has an inner end 10 of cross sectional shape corresponding to that of the recess 8 and sliding therewithin so that there can be no relative rotation between the push rod and the piston. The outer end 11 of the push rod is adapted to be connected to the linkage, not shown, which transmits force to the frictional surfaces. This construction provides for lost motion between the piston and push rod. Back of the piston 6, but still within the braking chamber the push rod is provided with a collar 12 of relatively large diameter having a coarse thread 13 on its periphery.

A nut 14 has an internal thread 15 engaging the collar 12. Said nut has an outer cylindrical wall slidably and rotatably fitting the aperture 16 in the front cover 2. The inner end of the nut 14 is of reduced diameter, slidably and rotatably seating upon the trunk 7. A nut 17 or equivalent structure is fixed to the inner end of the trunk 7 forming a flange which may abut the reduced portion of the nut 14 retaining it unitarily with the piston.

It is obvious that by turning the nut 14 in one or the other direction, the push rod may be drawn in or out of the piston taking up or increasing the slack in the brake system and this manual adjustment is available whenever any major change is to be made in the brake slack as when the brakes are relined or other parts are replaced.

The automatic operation of the brake slack adjusting mechanism of the present invention is effected through a means which measures the slack or amount of rectilinear motion which must be imparted to the brake before the brake setting action occurs and by means of which makes the adjustment responsive to a determined excess beyond the normal length of piston travel. This measuring device comprises a measuring wheel 18 mounted for rotation upon the trunk 7 adjacent the inner end of the piston 6. The measuring wheel reciprocates with the piston.

Figures 1, 2, 3 and 4 show that a flexible cable 19 is attached at one end to the periphery of the measuring wheel, riding in a groove 20 formed in the measuring wheel. Figure 1 shows that the cable 19 passes around a direction changing roller 21 and is anchored to a suitable fixed part of the braking chamber structure as beneath the head of the bolt 22 as shown in Figure 1. A spiral leaf spring 23 is secured at one end to the trunk 7 and at the other to the measuring wheel 18. Said spring is already under tension so that when the piston moves outwardly in the act of braking and slack occurs in the cable 19, the measuring wheel acts as a retriever in winding up the cable. Thus the angular position of the measuring wheel relative to a normal or zero position represents the distance through which the piston moves in setting the brakes.

In determining the value of the angle of displacement of the measuring wheel which shall effect an adjustment of the brake slack, one must consider that the piston moves a normal distance before bringing the brake shoes into contact with the wheels, after which the piston moves a further distance representing the compressing of the brake lining, the final tightening, etc. Since it is not desired to make the adjustment continuously but rather, step by step, a certain amount of movement of the piston is allowed for normal wear up to the point at which adjustment must be made, but when the angular displacement of the measuring wheel exceeds this distance then the adjusting mechanism comes into play and makes an adjustment of the brake slack.

The brake slack adjusting mechanism can be briefly described as follows: First there is a ratchet on the inner end of the nut, a pawl engageable with the ratchet for rotating the nut step by step, an intermediate member for engaging the pawl and an element carried by the measuring wheel for actuating the intermediate member. These parts will now be specifically described. The measuring wheel has an adjusting pin 24 projecting perpendicularly from the inner face of the measuring wheel. Said pin is pivotally mounted at 25 and normally rests against a stop 26 on the measuring wheel so that it cannot move beyond its normal perpendicular position in one direction. It is held against the stop by the spring 27. Mounted upon the trunk 7 in fixed relation thereto is a sleeve 28. This sleeve retains the measuring wheel in place. It also, as shown, serves as the anchorage for the inner end of the spring 23. It also, as illustrated in Figure 7, forms a support for the lugs 29 which carry the pivot pin 30 upon which the pawl lever 31 is mounted. The axis of the pivot pin 30 is parallel to the direction of movement of the piston, the pawl lever 31 therefore having the movement of oscillation transversely of the direction of movement of the piston. The pawl lever is shown in detail in Figure 8. It has a curved portion or stop 32 which as shown in Figure 7 abuts the lug 29 preventing the pawl lever from moving leftward beyond its normal vertical position. Said pawl lever has a projection 33 adapted to be engaged by the adjusting pin 24 and it has an angularly directed upper end 34 adapted to engage the pawl suspension lever 35.

The last named lever is mounted to swing upon an axis which is radial with respect to the piston 6. This mounting as shown comprises spaced lugs 36 and 37 through which a pin 38 passes, the pawl suspension lever having an eye 39 embracing said pin and having a spring 40 above said eye so that the pawl suspension lever 35 upon occasion can lift.

The piston is also provided laterally with respect to the pawl suspension lever 35 with a bracket 41, the outer end of which terminates adjacent the outer end of the pawl suspension lever. A bolt 42 is swingably mounted by means of a pin 57 on said bracket which passes through an eye in said bolt, the latter extending through an enlarged aperture 59 in said bracket. Said bolt passes freely through an aperture 43 in the pawl suspension lever which is elongated in the longitudinal direction of said lever so as to permit said pawl suspension lever to make a rocking movement with respect to said bolt. A spring 44 surrounds the bolt under tension abutting at one end against the bracket 41 and having the other end seated in a suitable cup 45 which bears against the adjacent side of the pawl suspension lever. This spring is a very important element since it is the instrumentality which imparts rotative movement to the nut 14.

The outer end of the pawl suspension lever 35 is provided with downwardly extending bifurcations 46 which carry a pin 47 upon which is mounted the adjusting pawl 48. A spring 60 fastened to pawl 48 at 61 and to lever 35 at 62 retains the pawl out of engagement with teeth 50. This pawl has a head 49 adapted to engage the ratchet teeth 50 on the inner end of the nut 14 for imparting step by step rotation to said nut. The opposite end of said pawl is formed as a cam 51 which rides upon a lug 52. The lug 52 is fixed to the sleeve 28 and since the sleeve 28 and the ratcheted end of the nut 14 are in different planes perpendicular to the axis of the piston trunk it follows that the cam end 51 of the pawl must be laterally offset with respect to the head 49 so that each can at the same time engage its respective cooperating part. This offset shape of the pawl is clearly shown in Figure 6.

At this point, it will assist in the understanding of the structure to describe its operation. Upon the admission of air to the braking chamber by way of the inlet 5, the diaphragm 4 is pushed back, in turn pushing the piston 6 which moves toward the right. The cable 19 becomes slack, the cable being wound upon the measuring wheel 18 giving the latter an angular displacement determined by the amount of slack in the cable. Assuming that the angular displacement is sufficient to cause an adjustment, the adjusting pin 24 will strike the projection 33 on the pawl lever 31, rocking the latter so as to bring the angular upper end of said pawl lever into contact with the pawl suspension lever 35, a position of parts shown in Figure 7. This moves the pawl suspension lever toward the right, still see Figure 7, compressing the spring 44. This movement also causes the cam end 51 of the pawl to ride up on the fixed lug 52 and brings the head 49 of said pawl down below the circumferential path of the ratchet teeth, or against the teeth. If the head of the pawl happens to come down upon the teeth, the entire pawl suspension lever including the pawl will be lifted, compressing the spring 40 so that there can be no jamming of parts. The angular movement of the measuring wheel will continue until the head of the pawl has fallen behind the abrupt face of one of the ratchet teeth 50. No adjustment takes place while the brakes are set, for the friction between the surfaces of the threads of the collar 12 and the nut 14 is too great. When however the brakes are released and the piston and diaphragm are returned to their normal position under the urge of the spring 53, the pressure between the cooperating teeth of the nut and collar is relieved, so that the spring 44 now expands pushing the pawl suspension lever 35 over to its normal position carrying the pawl 48 to the leftward and rotating the nut 14 to the extent of the width of one or more ratchet teeth as desired. Thus the necessary brake slack adjustment is effected by extending the collar 12 and push rod 9 rightwardly.

Figure 1 shows that the nut 14 and the sleeve 28, which latter is affixed to and therefore part of the piston 6, are spaced apart a slight distance and have their confronting faces provided with inter-engageable teeth 54 and 55. A spring 56 normally keeps these members apart. The object of this is when it is desired to make a manual take-up of the brake slack, which is done by simply rotating the nut 14, said nut is then relieved from the load of all the mechanical parts which would have to move therewith if the sleeve 28 and the nut 14 were integral. By the provision of the teeth, the nut can be turned alone without moving any other element. It is desirable to have the piston and nut rigidly interconnected at the time the brakes are set to prevent any rotation of the nut incident to the tension between the threads of the nut and the threads of the collar under the braking pressure. After the initial movement of the piston the teeth 54 and 55 come together so that the piston and nut are virtually a single part.

It is apparent from the above description that the present invention provides an entirely self-contained braking chamber or cylinder combining within a single unit the conventional braking instrumentalities, with novel and automatic means for taking up the brake slack, and that although the above description discloses what is believed to be a preferred and practical embodiment of the invention, it will be understood to those skilled in the art that the specific details as shown and described are to be regarded by way of example and not as limiting the scope of the invention as defined by the appended claims.

What I claim is:

1. Brake slack adjusting apparatus comprising a casing, a fluid pressure actuated piston therein, a push rod actuated by said piston adapted to operate brakes, said push rod being slidable with respect to said piston whereby the virtual length of said push rod may be varied, means for adjusting the length of said push rod relative to said piston, and a measuring unit including a wheel and cable, said cable being attached to said wheel and windable thereupon, a spring within said wheel urging the wheel in a cable-winding direction, said wheel being attached to said piston and said cable being attached to said casing, and means connected to said measuring wheel and acting on said adjusting means upon a determined excess movement of said measuring wheel for effecting an adjustment in the virtual length of said push rod.

2. Brake slack adjusting apparatus comprising a casing, a fluid pressure actuated piston therein, and a push rod actuated by said piston adapted to operate brakes, said push rod being slidable with respect to said piston whereby the virtual length of said push rod may be varied, means for adjusting the length of said push rod relative to said piston, a measuring wheel carried by said piston, means connecting said measuring wheel to a fixed part of the apparatus for displacing said measuring wheel circumferentially a distance proportional to the extent of movement of said piston in setting the brakes, and means carried by said measuring wheel engageable with said adjusting means for effecting an adjustment upon the displacement of said measuring wheel a distance representing a determined excess over the normal piston travel.

3. Brake slack adjusting apparatus comprising a casing, a fluid pressure actuated piston therein, and a push rod actuated by said piston adapted to operate brakes, said push rod being slidable with respect to said piston whereby the virtual length of said push rod may be varied, means for adjusting the length of said push rod relative to said piston, a measuring wheel carried by said piston, a cable attached to said measuring wheel adapted to ride circumferentially thereof and tether said measuring wheel to a fixed part of the apparatus, tensioning means normally biasing said measuring wheel in a direction to keep the cable taut, whereby upon movement of said piston to brake-setting position said measuring wheel is displaced through a circumferential distance proportional to the brake-setting movement of said piston, and means carried by said measuring wheel engageable with said adjusting means for effecting an adjustment upon the displacement of said measuring wheel a distance representing a determined excess over the normal piston travel.

4. Brake slack adjusting apparatus comprising a casing, a fluid pressure actuated piston therein, and a push rod actuated by said piston adapted to operate brakes, said push rod being slidable with respect to said piston whereby the virtual length of said push rod may be varied, a nut rotatably carried by said piston having threads engaging threads on said push rod for adjusting the length of said push rod relative to said piston, a measuring wheel carried by said piston, a cable attached to said measuring wheel adapted to ride circumferentially thereof and tether said measuring wheel to a fixed part of the apparatus, tensioning means normally biasing said measuring wheel in a direction to keep the cable taut, whereby upon movement of said piston to brake-setting position said measuring wheel is displaced a circumferential distance proportional to the brake-setting movement of said piston, and a train of interacting elements between said measuring wheel and nut operative, through displacement of said measuring wheel a distance proportional to a determined excess movement of said piston, for rotating said nut to effect a brake slack adjustment.

5. Brake slack adjusting apparatus comprising a casing, a fluid pressure actuated piston therein, and a push rod actuated by said piston adapted to operate brakes, said push rod being slidable with respect to said piston whereby the virtual length of said push rod may be varied, a nut rotatably carried by said piston and engaging threads on said push rod for adjusting the length of the latter, ratchet teeth on said nut and a pawl engageable with said ratchet teeth for effecting step by step adjustment of said nut, a measuring wheel carried by said piston, a cable attached to said measuring wheel adapted to ride circumferentially thereof and tether said measuring wheel to a fixed part of the apparatus, tensioning means normally biasing said measuring wheel in a direction to keep the cable taut, whereby upon movement of said piston to brake-setting position said measuring wheel is displaced a circumferential distance proportional to the brake-setting movement of said piston, means including an element carried by said measuring wheel for rocking said pawl into engagement with said ratchet teeth when the displacement of said measuring wheel represents a determined excess movement of said piston, and means operable upon release of the braking tension between said nut and push rod for shifting said pawl and thereby rotating said nut through one or more steps of adjustment.

6. Brake slack adjusting apparatus comprising a casing, a fluid pressure actuated piston therein, and a push rod actuated by said piston adapted to operate brakes, said piston having an axial trunk formed with a recess of non-round cross section and said push rod having an end fitting slidably, but non-rotatably within said trunk, a nut rotatably mounted on said trunk having threads engaging threads on the push rod whereby upon turning said nut said push rod is advanced or retracted with respect to said piston, said nut being manually adjustable and also having ratchet teeth whereby it may be automatically adjusted step by step, a measuring wheel rotatably mounted upon said trunk and movable with said piston, a cable attached to said measuring wheel adapted to ride circumferentially thereof and tether said measuring wheel to a fixed part of the apparatus, tensioning means normally biasing said measuring wheel in a direction to keep the cable taut, whereby upon movement of said piston to brake-setting position said measuring wheel is displaced a circumferential distance proportional to the brake-setting movement of said piston, a pawl support mounted upon said piston swingable in a plane parallel to a plane tangent to said ratchet teeth, a pivoted pawl suspended from said support adapted to engage said ratchet teeth, fixed means engageable by said pawl for tilting it in a ratchet tooth engaging position, means on said measuring wheel operable when the displacement of said measuring wheel represents a determined excess in the movement of said piston for swinging said pawl support in one direction to bring said pawl into engagement with said tilting means and engaging said pawl with said ratchet teeth, and means operable upon release of the braking tension between the threads of said nut and push rod for swinging said pawl support in the opposite direction, thereby shifting said pawl and rotating said nut through a step of adjustment.

7. Brake slack adjusting mechanism comprising a casing, a fluid pressure actuated piston therein, and a push rod actuated by said piston adapted to operate brakes, said piston having a trunk formed with a recess of non-round cross section, said push rod having a correspondingly shaped end slidably but non-rotatably fitting in said recess, said push rod having an enlarged collar formed with a coarse thread, a nut having a reduced portion rotatably bearing upon said trunk, means for retaining said nut upon said trunk, that is, unitarily with said piston, said nut having threads engaging the threads on said collar and being capable of being manually rotated for taking up slack manually, said nut being formed with ratchet teeth whereby step by step automatic adjustment of the length of said push rod may be effected, a measuring wheel journalled on said trunk, a cable attached to said measuring wheel adapted to ride circumferentially thereof and tether said measuring wheel to a fixed part of the apparatus, tensioning means normally biasing said measuring wheel in a direction to keep the cable taut, whereby upon movement of said piston to brake-setting position said measuring wheel is displaced a circumferential distance proportional to the brake-setting movement of said piston, a pawl-supporting lever mounted on said piston swingable in a plane parallel to a plane tangent to the ratchet teeth carried by said nut, a pivoted pawl suspended from said supporting lever having a head end engageable with said ratchet teeth, the opposite end being formed as a cam, a fixed lug engageable by the cam end of said pawl for tilting the head end of said pawl in a ratchet tooth-engaging position, a sleeve fixed to said trunk between said measuring wheel and nut, an intermediate lever mounted on said sleeve swingable on an axis longitudinally of said push rod, and means on said measuring wheel engaging said intermediate lever when said measuring wheel has been displaced a distance representing a determined excess movement of said piston, actuating said intermediate lever to swing said pawl support in one direction, tilting said pawl and engaging the head end thereof with a ratchet tooth of said nut, and a spring operable upon diminution of the frictional pressure between the interengaged threads of said nut and push with it said pawl, rotating said nut through a step of adjustment.

8. Brake slack adjusting apparatus comprising a casing, a fluid pressure actuated piston therein, and a push rod actuated by said piston adapted to operate brakes, said push rod being slidable with respect to said piston whereby the virtual length of said push rod may be varied, means for adjusting the length of said push rod relative to said piston, a measuring wheel carried by said piston and spring biased in a winding direction, a cable attached at one end to said measuring wheel and anchored to a fixed part of the mechanism at the other, whereby upon movement of said piston in a brake-setting direction said cable is wound upon said measuring wheel and the latter displaced through a circumferential distance proportional to the brake-setting movement of said piston, and means carried by said measuring wheel engageable with said adjusting means for effecting an adjustment upon the displacement of said measuring wheel a distance representing a determined excess over the normal piston travel.

9. Brake slack adjusting apparatus comprising a casing, a fluid pressure actuated piston therein, and a push rod actuated by said piston adapted to operate brakes, said push rod being slidable with respect to said piston whereby the virtual length of said push rod may be varied, a nut rotatably carried by said piston having threads engaging threads on said push rod for adjusting the length of said push rod relative to said piston, a measuring wheel carried by said piston and spring biased in a winding direction, a cable attached at one end to said measuring wheel and anchored at the other to a fixed part of said apparatus, whereby upon movement of said piston the slack of said cable permits displacement of said measuring wheel through a circumferential distance proportional to the movement of said piston in the brake-setting operation, and a train of interacting elements between said measuring wheel and nut operative, through displacement of said measuring wheel a distance proportional to a determined excess movement of said piston, for rotating said nut to effect a brake slack adjustment.

10. Brake slack adjusting apparatus comprising a casing, a fluid pressure actuated piston therein, and a push rod actuated by said piston adapted to operate brakes, said push rod being slidable with respect to said piston whereby the virtual length of said push rod may be varied, a nut rotatably carried by said piston and engaging threads on said push rod for adjusting the length of the latter, ratchet teeth on said nut and a pawl engageable with said ratchet teeth for effecting step by step adjustment of said nut, a measuring wheel carried by said piston spring biased in a winding direction, a cable having an end fastened to said measuring wheel and being anchored at its opposite end to a fixed part of the apparatus, whereby upon movement of said piston in the brake-setting operation, the take-up of the slack of said cable displaces said measuring wheel through a circumferential distance proportional to said piston movement, means including an element carried by said measuring wheel for rocking said pawl into engagement with said ratchet teeth when the displacement of said measuring wheel represents a determined excess movement of said piston, and means operable upon release of the braking tension between said nut and push rod for shifting said pawl and thereby rotating said nut through a step of adjustment.

11. Brake slack adjusting apparatus comprising a casing, a fluid pressure actuated piston therein, and a push rod actuated by said piston adapted to operate brakes, said piston having an axial trunk formed with a recess of non-round cross section and said push rod having an end fitting slidably, but non-rotatably within said trunk, a nut rotatably mounted on said trunk having threads engaging threads on the push rod whereby upon turning said nut said push rod is advanced or retracted with respect to said piston, said nut being manually adjustable and also having ratchet teeth whereby it may be automatically adjusted step by step, a measuring wheel rotatably mounted upon said trunk and movable with said piston, said measuring wheel being spring biased in a winding direction, a cable having one end attached to said measuring wheel and the other anchored to a fixed part of the apparatus whereby upon movement of said piston in a brake-setting operation, the slack of said cable winding upon said measuring wheel permits a circumferential displacement of the latter proportional to the movement of said piston, a pawl support mounted upon said piston swingable in a plane parallel to a plane tangent to said ratchet teeth, a pivoted pawl suspended from said support adapted to engage said ratchet teeth, fixed means engageable by said pawl for tilting it in a ratchet tooth-engaging position, means on said measuring wheel operable when the displacement of said measuring wheel represents a determined excess in the movement of said piston for swinging said pawl support in one direction to bring said pawl into engagement with said tilting means and engaging said pawl with said ratchet teeth, and means operable upon release of the braking tension between the threads of said nut and said push rod for swinging said pawl support in the opposite direction thereby shifting said pawl and rotating said nut through a step of adjustment.

12. Brake slack adjusting mechanism comprising a casing, a fluid pressure actuated piston therein, and a push rod actuated by said piston adapted to operate brakes, said piston having a trunk formed with a recess of non-round cross section, said push rod having a correspondingly shaped end slidably but non-rotatably fitting in said recess, said push rod having an enlarged collar formed with a coarse thread, a nut having a reduced portion rotatably bearing upon said trunk, means for retaining said nut upon said trunk, that is, unitarily with said piston, said nut having threads engaging the threads on said collar and being capable of being manually rotated for taking up slack manually, said nut being formed with ratchet teeth whereby step by step automatic adjustment of the length of said push rod may be effected, a measuring wheel journalled on said trunk, spring biased in a winding direction, a cable attached at one end to said measuring wheel and anchored at the other end to a fixed part of the apparatus, whereby when said piston moves in a brake-setting direction the winding of the slack of said cable will displace said measuring wheel through a circumferential distance proportional to the movement of said piston, a pawl-supporting lever mounted on said piston swingable in a plane parallel to a plane tangent to the ratchet teeth carried by said nut, a pivoted pawl suspended from said supporting lever having a head and engageable with said ratchet teeth, the opposite end being formed as a cam, a fixed lug engageable by the cam end of said pawl for tilting the head end of said pawl in a ratchet tooth-engaging position, a sleeve fixed to said trunk between said measuring wheel and nut, an intermediate lever mounted on said sleeve swingable on an axis longitudinally of said push rod, and means on said measuring wheel engaging said intermediate lever when said measuring wheel has been displaced a distance representing a determined excess movement of said piston, actuating said intermediate lever to swing said pawl support in one direction, tilting said pawl and engaging the head end thereof with a ratchet tooth of said nut, and a spring operable upon diminution of the frictional pressure between the interengaged threads of said nut and push rod when the brakes are released, for swinging said pawl support in the opposite direction, and with it said pawl, rotating said nut through a step of adjustment.

13. Brake slack adjusting apparatus comprising a casing, a fluid pressure actuated piston therein, and a push rod partly within said casing and extending therefrom, actuated by said piston and adapted to operate brakes, said push rod being slidable with respect to said piston whereby the virtual length of said push rod may be varied, means for adjusting the length of said push rod relative to said piston, and a measuring unit comprising two elements, said elements including a wheel and a cable, said cable being attached to said wheel and windable thereupon, a spring for urging said wheel in a cable-winding direction, one of said measuring unit elements being attached to said piston and the other to said casing, and means connected to said measuring wheel and acting on said adjusting means upon a predetermined excess movement of said measuring wheel, for effecting an adjustment in the virtual length of said push rod.

14. Brake slack adjusting apparatus comprising a casing, a fluid pressure actuated piston therein, and a push rod partly within said casing and extending therefrom actuated by said piston adapted to operate brakes, said push rod being slidable with respect to said piston whereby the virtual length of said push rod may be varied, means within said casing for adjusting the length of said push rod relative to said piston, a measuring wheel within the casing carried by said piston, a cable within said casing attached to said measuring wheel adapted to ride circumferentially thereof and tether said measuring wheel to a fixed part of the apparatus within said casing, and tensioning means also in said casing normally biasing said measuring wheel in a direction to keep the cable taut, whereby upon movement of said piston to brake-setting position said measuring wheel is displaced a circumferential distance proportional to the brake-setting movement of said piston and means carried by said measuring wheel engageable with said adjusting means for effecting an adjustment upon the displacement of said measuring wheel a distance representing a determined excess over the normal piston travel.

FRANCIS O. GRAYSON.